US 12,231,357 B2

(12) United States Patent
Tsukamoto et al.

(10) Patent No.: US 12,231,357 B2
(45) Date of Patent: Feb. 18, 2025

(54) BASE STATION SYSTEM, RADIO UNIT AND WIRELESS COMMUNICATION APPARATUS

(71) Applicant: KDDI CORPORATION, Tokyo (JP)

(72) Inventors: Yuu Tsukamoto, Fujimino (JP); Shinobu Nanba, Fujimino (JP); Haruhisa Hirayama, Fujimino (JP); Shigeo Terabe, Tokyo (JP); Hayato Fukuda, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 722 days.

(21) Appl. No.: 17/397,065

(22) Filed: Aug. 9, 2021

(65) Prior Publication Data
US 2021/0367721 A1    Nov. 25, 2021

Related U.S. Application Data

(63) Continuation of application No. PCT/JP2019/047056, filed on Dec. 2, 2019.

(30) Foreign Application Priority Data

Feb. 15, 2019   (JP) .................................. 2019-025013

(51) Int. Cl.
*H04L 5/00*    (2006.01)
*H04W 48/16*   (2009.01)
*H04W 72/23*   (2023.01)

(52) U.S. Cl.
CPC .......... *H04L 5/0035* (2013.01); *H04L 5/0005* (2013.01); *H04W 48/16* (2013.01); *H04W 72/23* (2023.01)

(58) Field of Classification Search
CPC .... H04L 5/0035; H04L 5/0005; H04W 48/16; H04W 72/23; H04W 24/02; H04W 72/12; H04W 88/085; H04B 1/40
See application file for complete search history.

(56) References Cited

U.S. PATENT DOCUMENTS

2015/0351105 A1*  12/2015  Lee .................. H04M 3/22
                                              370/329
2017/0064031 A1    3/2017  Sunay
                       (Continued)

FOREIGN PATENT DOCUMENTS

JP       2017-200172 A    11/2017

OTHER PUBLICATIONS

CMCC: "Further considerations on the CU/DU relationship," 3GPP Draft; R3-171667_Further Considerations on the Cu-Du Relationship, 3rd Generation Partnership Project (3GPP), Mobile Competence Centre; 650, Route Des Lucioles; F-06921 Sophia-Antipolis Cedex vol. RAN WG3, No. Hangzhou, China; May 15, 2017-May 19, 2017, May 14, 2017, XP051276453, Retrieved from the Internet: URL:http://www.3gpp.org/ftp/Meetings_3GPP_ SYNC/RAN3/Docs/ * figure 1 *.

(Continued)

*Primary Examiner* — Michael Y Mapa
(74) *Attorney, Agent, or Firm* — Foley & Lardner LLP

(57) ABSTRACT

A plurality of DUs have at least a radio resource scheduling function among functions of a base station and each correspond to one or more slices. The plurality of CUs are each connected between a different DU among of the plurality of DUs and a core network, and each has, among the functions of the base station, a upper layer function than a function that the DU has. A radio unit (RU) has at least a radio wave transmission/reception function among the functions of the base station, and is deployed at an antenna site. The RU is connected with a plurality of DUs, and a plurality of slices provided through the plurality of DU are provided in the same cell formed by the RU 30.

17 Claims, 12 Drawing Sheets

(56) References Cited

U.S. PATENT DOCUMENTS

| | | | |
|---|---|---|---|
| 2017/0164215 | A1 | 6/2017 | Chen et al. |
| 2018/0248787 | A1 | 8/2018 | Rajagopal et al. |
| 2018/0368109 | A1 | 12/2018 | Kim |
| 2019/0320486 | A1* | 10/2019 | Khan .................. H04B 7/0413 |
| 2020/0195521 | A1* | 6/2020 | Bogineni ............. H04W 36/26 |

OTHER PUBLICATIONS

EP Office Action and Extended Search Report on EP Appl. Ser. No. EP 19914718 dated Feb. 23, 2022 (13 pages).

KT Corp: "Considerations for FI Setup Procedure," 3GPP Draft; R3-174854 Considerations for FI Setup Procedure_R2(KT), 3rd Generation Partnership Project (3GPP), Mobile Competence Centre; 650, Route Des Lucioles; F-06921 Sophia-Antipolis Cedex; Fra vol. RAN WG3, No. Reno, NV, USA; Nov. 27, 2017-Dec. 1, 2017, Nov. 18, 2017, XP051373570, Retrieved from the Internet: URL:http://www.3gpp.org/ftp/tsg%5Fran/WG3%5Fiu/TSGR3%5F98/Docs/ * the whole document *.

ZTE: "The function split between CU and DU," 3GPP Draft; R3-160804, 3rd Generation Partnership Project (3GPP), Mobile Competence Centre; 650, Route Des Lucioles; F-06921 Sophia-Antipolis Cedex; France vol. RAN WG3, No. Bangalore, India; Apr. 11, 2016-Apr. 15, 2016, Apr. 1, 2016, XP051082950, Retrieved from the Internet: URL:http://www.3gpp.org/ftp/tsg_ran/WG3_lu /TSGR3_91bis/Docs/ * the whole document *.

KDDI Research Institute, Inc., "Slicing technology developments for virtualized 5G base station", [online], May 21, 2018, [Searched on Feb. 12, 2019], Internet<URL: https://www.kddi-research.jp/newsrelease/2018/052101.html>.

Tsukamoto, et al., "RAN slicing architecture with base station function division and placement according to various 5G services," IEICE Technical Report, vol. 118, No. 208, CS2018-53, pp. 69-74, Sep. 2018, with English translation.

* cited by examiner

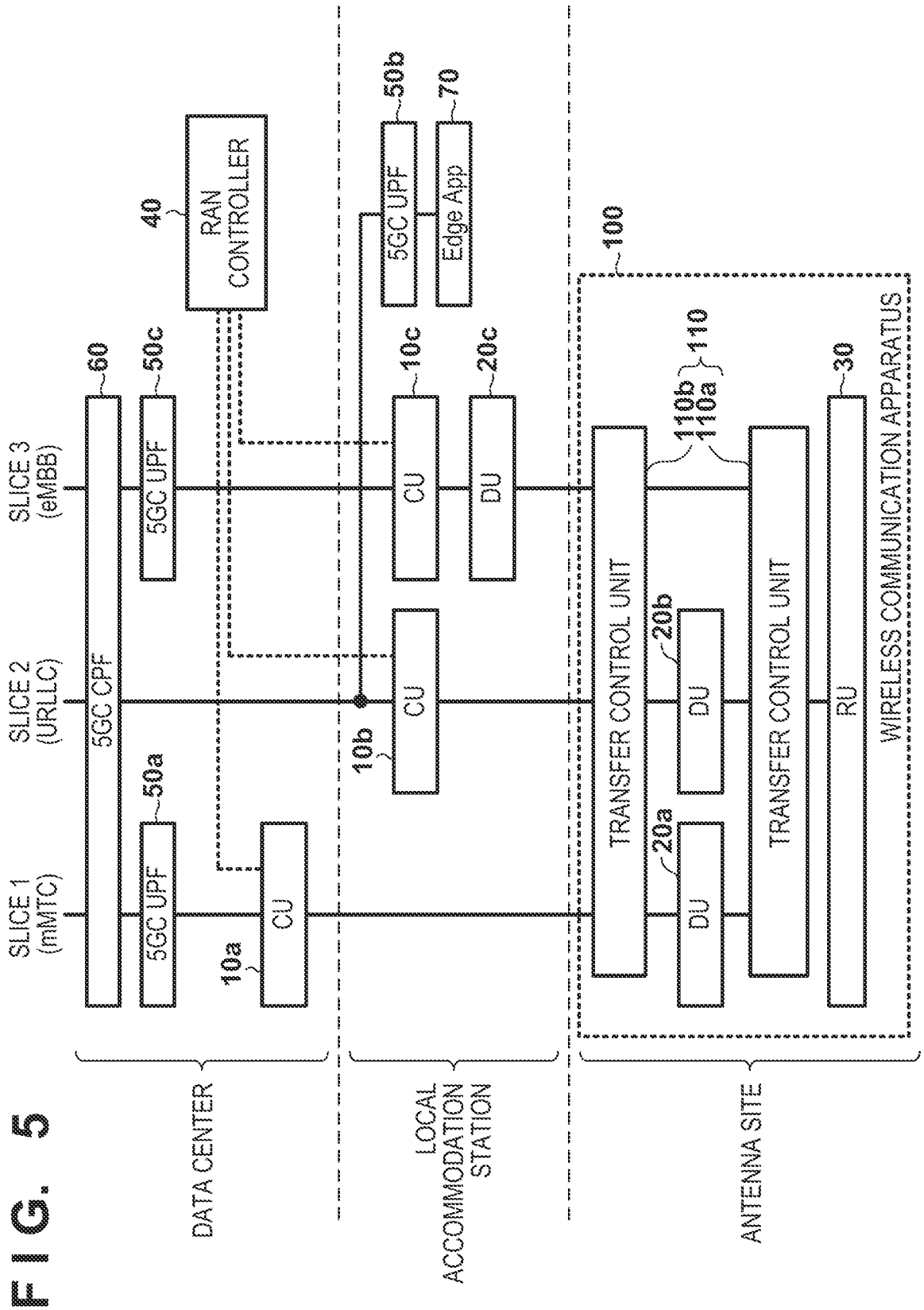
F I G. 5

BASE STATION SYSTEM, RADIO UNIT AND WIRELESS COMMUNICATION APPARATUS

CROSS-REFERENCE TO RELATED APPLICATION(S)

This application is a continuation of International Patent Application No. PCT/JP2019/047056 filed on Dec. 2, 2019, which claims priority to and the benefit of Japanese Patent Application No. 2019-025013 filed on Feb. 15, 2019, the entire disclosures of which are incorporated herein by reference.

TECHNICAL FIELD

The present invention relates to a base station system, a radio unit, and a wireless communication apparatus to which network slicing is applied.

BACKGROUND ART

In fifth-generation (5G) mobile communication systems, service types are roughly divided into three types, namely, large-capacity (eMBB: enhanced Mobile BroadBand), ultra-low-latency (URLLC: Ultra-Reliable and Low Latency Communications), and massive-access (mMTC: massive Machine Type Communications), and the service requirements differ from each other. In order to economically and flexibly provide services with such different requirements, network slicing has been considered.

A base station of LTE (Long Term Evolution) is usually composed of an RRH (Remote Radio Head) and a BBU (Baseband Unit), and the base station functions are divided between and deployed in the RRH and the BBU, respectively. Specifically, among the functions of the base station (in order from an upper layer, RF, PHY, MAC, RLC, and PDCP), RF is deployed in the RRH, and functions other than RF are deployed in the BBU. In recent years, redefinition of base station functions to be deployed in RRHs and BBUs has been discussed in 3GPP (redefinition of function division). In general, it is known that the performance of inter-base station coordination (inter-cell coordination), the amount of delay on an application, the utilization efficiency of a network, and the like are different depending on function division options and the location of the BBU deployment. In 5G where the initial version of the specification was established as 3GPP Release 15, the nodes in which lower layer functions are deployed are called DU (Distributed Unit), and the nodes in which upper layer functions are deployed are called CU (Central Unit).

NPTL1 and NPTL2 propose a RAN slicing architecture in which a virtual network (slice), in which an appropriate function division option and a BBU are deployed according to a service, can be selected. With this RAN slicing architecture, for each service, a CU (BBU) with appropriate functional division options being applied can be launched as a virtual machine on a server deployed in an appropriate location and each CU can be connected to a corresponding DU (RRH).

In the conventional technique described above, when a plurality of slices are generated corresponding to a plurality of services, a single DU is connected to each of a plurality of CUs for providing the slices. This means that it is necessary to prepare, for each slice, a radio unit including lower layer functions such as RF and PHY among the functions of the base station. In this way, it is necessary to prepare a radio unit for each slice, and it is impossible to provide a plurality of slices (services) in a cell formed by a single radio unit. Therefore, it is difficult to immediately cope with the addition of or change to services, and there is a problem in that the cost associated with the installation of the radio unit increases as the number of slices increases.

CITATION LIST

Non-Patent Literature

NPTL1: KDDI Research Institute, Inc., "Slicing technology developments for virtualized 5G base station", [online], May 21, 2018, [Searched on Feb. 12, 2019], Internet <URL: https://www.kddi-research.jp/newsrelease/2018/052101.html>

NPTL2: Tsukamoto, Namba, Nishimura, "RAN slicing architecture with base station function division and placement according to various 5G services," IEICE Technical Report, Vol. 118, No. 208, CS2018-53, pp. 69-74, September 2018.

SUMMARY OF THE INVENTION

The present invention was conceived in view of the above described problems. The present invention has an object to provide a technique that enables a plurality of slices (services) to be provided using a single radio unit in a base station system to which network slicing is applied.

According to one aspect of the present invention, there is provided a base station system comprising: a plurality of first units each having at least a radio resource scheduling function among functions of a base station, and each corresponding to one or more slices; a plurality of second units each connected between a different one first unit among of the plurality of first units and a core network, and each having, among the functions of the base station, a upper layer function than a function that the one first unit has; and one radio unit having at least a radio wave transmission/reception function among the functions of the base station, and deployed at an antenna site, wherein the radio unit is connected with the plurality of first units, and a plurality of slices provided via the plurality of first units are provided in the same cell formed by the radio unit.

According to another aspect of the present invention, there is provided a radio unit constituting a part of a base station system and deployed at an antenna site, the base station system including: a plurality of first units each having at least a radio resource scheduling function among functions of a base station, and each corresponding to one or more slices; and a plurality of second units each connected between a different one first unit among of the plurality of first units and a core network, and each having, among the functions of the base station, a upper layer function than a function that the one first unit has, wherein the radio has at least a radio wave transmission/reception function among the functions of the base station, and the radio unit is connected with the plurality of first units, and the plurality of slices provided via the plurality of first units are provided in the same cell formed by the radio unit.

By virtue of the present invention, it becomes possible to provide a plurality of slices (services) using a single radio unit in a base station system to which network slicing is applied.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 5 is a diagram showing a configuration example of a base station system (Second Embodiment).

DESCRIPTION OF EMBODIMENTS

Figure 1:
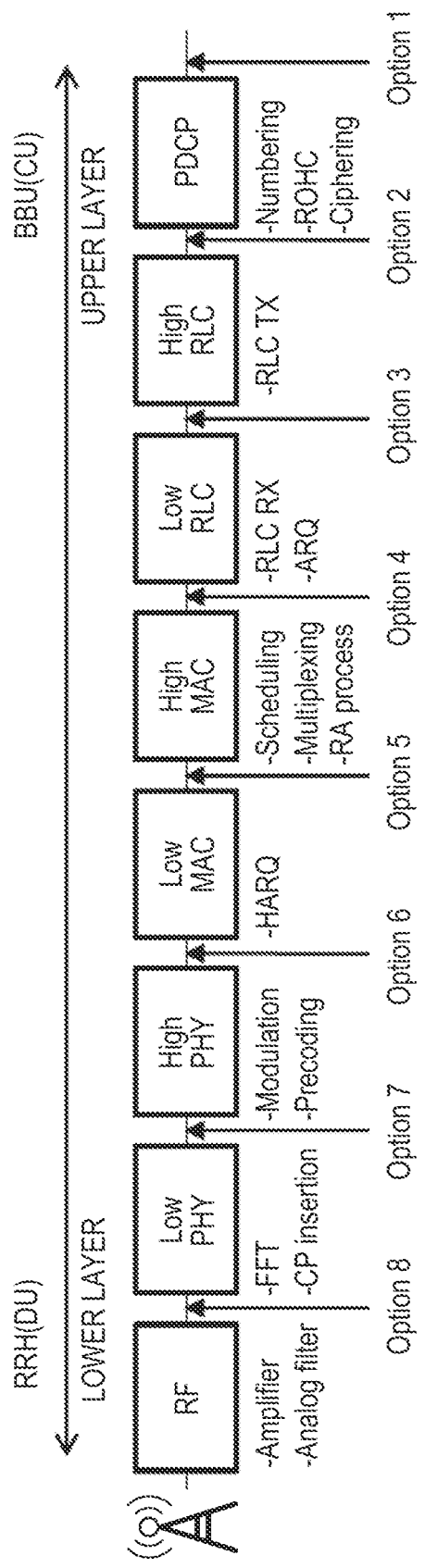
FIG. 1 is a diagram illustrating an example of options for functional division of a base station.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

In the first embodiment, a configuration example of a base station that enables a plurality of slices (services) to be provided by a single radio unit without providing a radio unit (RU) that constitutes a base station (base station system) for each slice will be described.
<Base Station Function Division>
Base stations (base station systems) generally have multiple functions ranging from lower layer functions to upper layer functions, and these functions are deployed dividing them between DUs and CUs. As described above, the DU corresponds to an RRH in LTE, and the CU corresponds to a BBU in LTE. FIG. 1 is a diagram showing options for dividing base station functions defined in 3GPP, and the dividing points when dividing and deploying the functions (RF, PDCP) of the respective layers of the base station between the DU and CU are shown as options 1 to 8. The division and deployment of base station functions between the DU and CU deploys some of the functions of the upper layer of the base station in the CU and deploys the rest of the functions in the DU.

Figure 2:
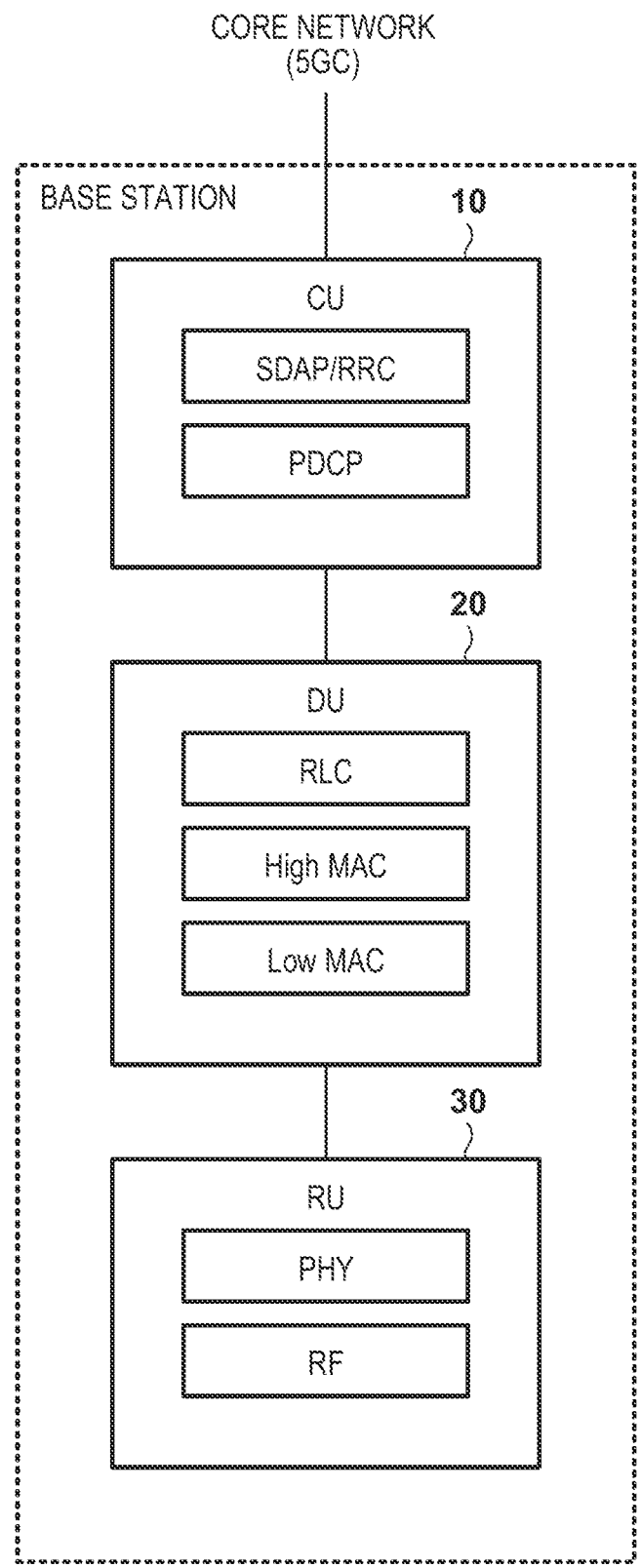
FIG. 2 is a diagram showing an example of the functional configuration of a CU, DU and RU in a base station system.

FIG. 2 is a diagram showing an example of a configuration in which a plurality of functions of different layers of a base station shown in FIG. 1 are divided between a CU, a DU, and an RU. As shown in FIG. 2, in the present embodiment, a Radio Unit (RU) having functions such as RF and PHY is newly provided in addition to CU and DU. The base station (base station system) of FIG. 2 is constituted by a CU 10, a DU 20 and an RU 30, the CU 10 is connected to a core network (5GC, EPC, etc.), and the DU 20 is connected between CU 10 and RU 30.

The DU 20 is an example of a first unit having at least a radio resource scheduling function among the base station functions. The CU 10 is an example of a second unit having, among the functions of the base station, an upper layer function than a function that the connected DU 20 (first unit) has. Further, the RU 30 is an exemplary radio unit having at least a radio wave (RF) transmission/reception function among the functions of the base station.

In the configuration example of FIG. 2, the DU 20 has not only a High MAC function corresponding to the scheduling function but also the RLC and Low MAC functions, and the CU 10 has SDAP/RRC and PDCP functions, which are upper layer functions than functions that the DU 20 has. In addition, the RU 30 has not only the RF function corresponding to the radio wave transmission/reception function, but also the function of PHY. Note that it may be that only some of the functions of the PHY are implemented in the RU 30, and the remaining functions of the PHY are implemented in the DU 20.

Hereinafter, the configuration and operation of the base station system according to the present embodiment will be specifically described using the functional configuration shown in FIG. 2 as an example.

Comparative Example

Figure 3:
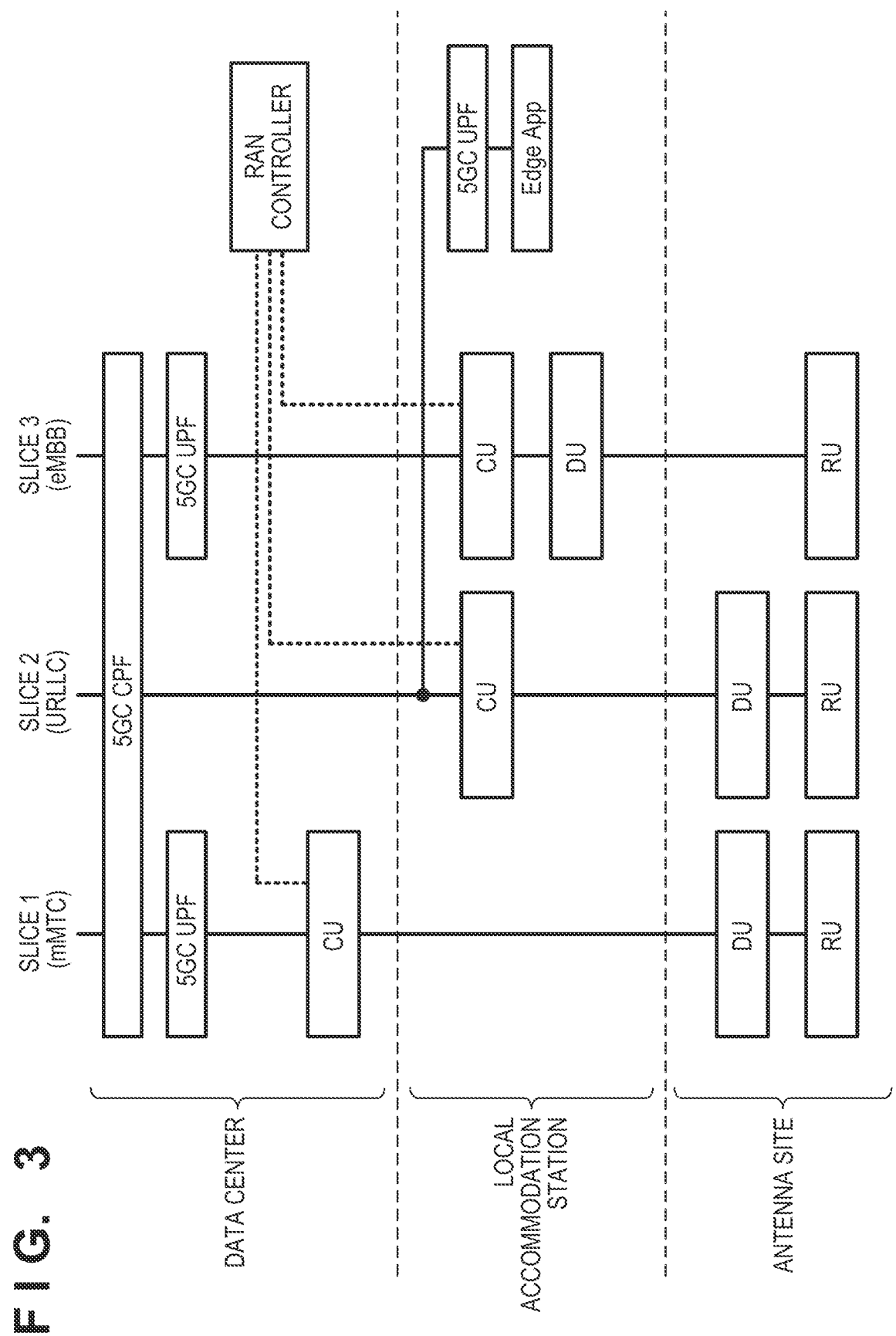
FIG. 3 is a diagram showing a configuration example of a base station system (comparative example).

FIG. 3 is a diagram showing a configuration example of a base station system in which slices 1 to 3 corresponding to mMTC, URLLC and eMBB are generated as service types, and shows a comparative example with respect to the configuration (FIG. 4) of the present embodiment described later. The CU and DU are controlled and managed by an NFV/SDN based RAN controller, and slices are generated by the RAN controller.

In the configuration of FIG. 3, the base station system is composed of CUs and DUs corresponding to each of slices 1 to 3 and an RU connected to each DU and deployed at the antenna site. The CU and DU are deployed in different places for each slice. The performance of inter-base station coordination (inter-cell coordination), the amount of delay on an application, the utilization efficiency of a network, and the like are different depending on CU and DU deployment. For this reason, in the configuration of FIG. 3, the CU and DU deployment suitable for each slice (service) is made.

In slice 1 (mMTC slice) of FIG. 3, the DU is deployed at the antenna site, and the CU is deployed in the data center which is farther from the antenna site than the local accommodation station (local office). For mMTC slices, assuming an IoT service with small data sizes and lenient delay constraints, it is suitable to deploy a CU (CU-UP) in a data center. When the functions are divided between the DU and the CU as shown in FIG. 2, the delay constraints relating to the processing of the base station functions between DU and CU are relaxed, so that long-distance transmission can be performed. Therefore, the CU can be deployed at a data center that is a far from the antenna site. Data centers can efficiently accommodate mMTC services because computing resources are ample and statistical multiplexing is achieved by aggregating multiple DUs.

In slice 2 (URLLC slice) of FIG. 3, the DU is deployed at the antenna site, and the CU is deployed at the local accommodation station. In the URLLC slice, it is suitable to deploy many functions of base stations at the antenna site (DUs and RUs) to provide services where low latency is required. Further, as shown in FIG. 3, by deploying the CU and 5GC UPF (5G Core User Plane Function) in the local accommodation station, MEC (Multi-Access Edge Computing) can be introduced, thereby realizing low latency.

In slice 3 (eMBB slice) of FIG. 3, the CU and the DU are deployed in the local accommodation station. In the eMBB slice, it is assumed that large volumes will be required and the user will move. In this case, it is suitable to deploy the DU having a radio resource scheduling function in the local accommodation station to enable inter-base station coordination (inter-cell coordination). It can be expected that the service quality can be maintained by the inter-cell coordination even at the cell edge where the radio quality deteriorates.

In a configuration as in the comparative example, it is necessary to deploy an individual RU (Radio Unit) for each slice at the antenna site, and it is impossible to provide a plurality of slices (services) in a cell formed by a single RU. Therefore, it is necessary to prepare as many RUs as the number of slices, and as the number of slices increases, the cost associated with the installation of RUs also increases.

<Configuration of Base Station System>

The base station system of the present embodiment has a configuration in which a plurality of DUs and CUs are connected to a single RU (i.e., the RU is shared among a plurality of DUs and CUs) without providing an RU for each slice. This makes it possible to accommodate a plurality of services (slices) with a single RU.

Figure 4:
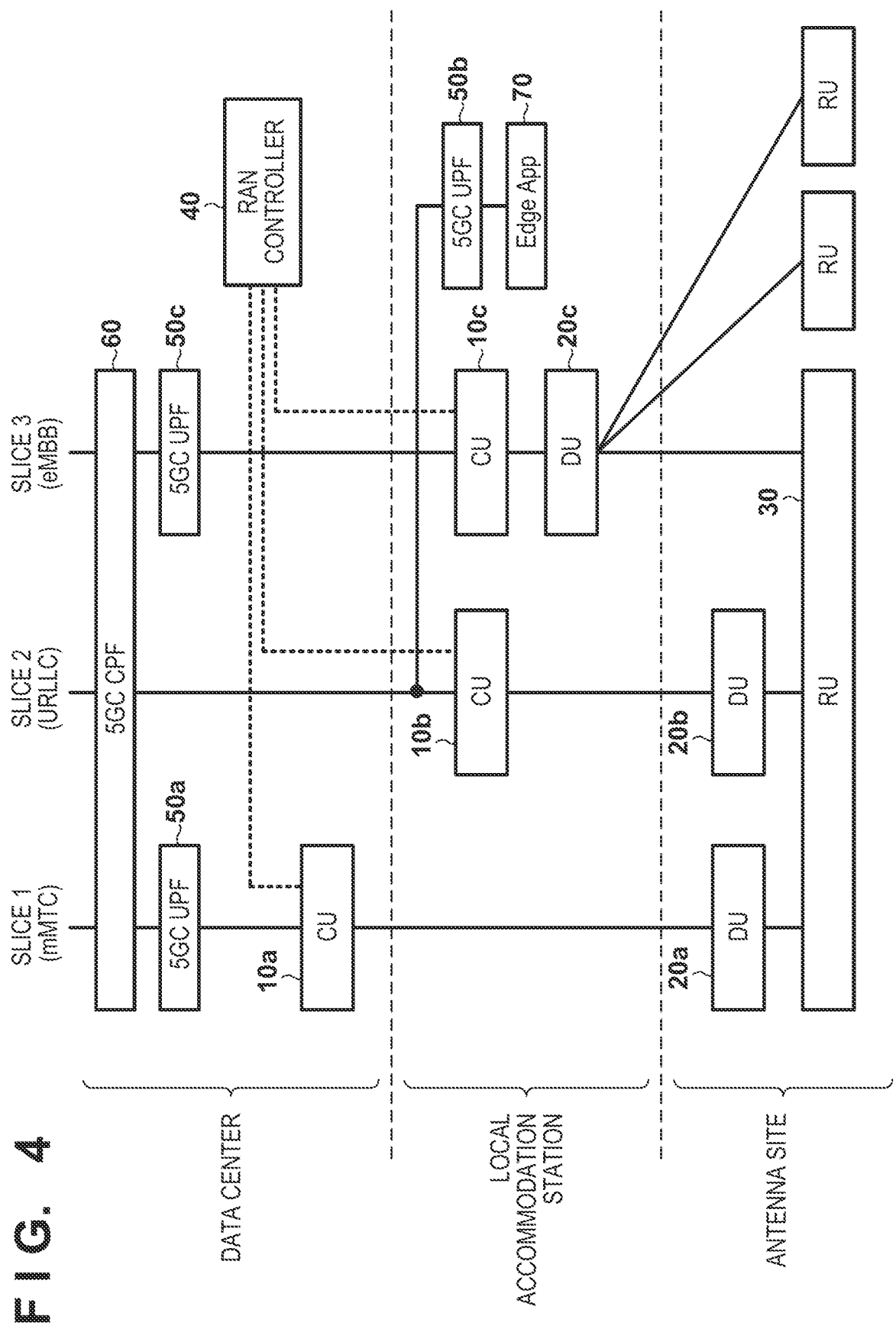
FIG. 4 is a diagram showing a configuration example of a base station system (First Embodiment).

FIG. 4 is a diagram showing a configuration example of a base station system according to the present embodiment. In the present embodiment, a core network or a RAN (radio access network) is provided with a RAN controller 40 for controlling functions of the RAN. The RAN controller 40 sets (generates) slices corresponding to service requirements for a plurality of CUs 10 (10a, 10b, 10c) and a plurality of DUs 20 (20a, 20b, 20c) on the RAN. In the example of FIG. 4, similarly to the comparative example of FIG. 3, slices 1 to 3 corresponding to mMTC, URLLC and eMBB service requirements are generated.

In the present embodiment, a 5G network configuration is assumed as an example. In FIG. 4, a 5GC CPF (5G Core Control Plane Function) 60 is a control process function group of a 5G core network. The 5GC UPF 50 (50a, 50b, 50c) is a data processing function group of a 5G core network, and is provided for each slice. The 5GC UPF 50a corresponds to slice 1, the 5GC UPF 50b to slice 2, and the 5GC UPF 50c to slice 3.

The base station system includes a plurality of CUs 10 (10a, 10b, 10c), a plurality of DUs 20 (20a, 20b, 20c), and a single RU 30. The CU 10a and DU 20a correspond to slice 1, the CU 10b and DU 20b to slice 2, and the CU 10c and DU 20c to slice 3. As described above, the plurality of CUs 10 correspond to the respective different slices, and the same applies to the plurality of DUs 20 corresponding to the plurality of CUs 10. Note that the plurality of CUs 10 may each correspond to one or more slices, and some corresponding slices may be shared among different CUs 10. Also, the plurality of DUs 20 may each correspond to one or more slices, and some corresponding slices may be shared among different CUs 20.

The DU 20 has at least a radio resource scheduling function (e.g., a High MAC function) among the functions of the base station. Each DU 20 is deployed at the antenna site or is deployed (at the local accommodation station) between the antenna site and the core network.

Each CU 10 is deployed between a different one DU among the DUs 20 and the core network, and has, among the base station functions, a upper layer function (e.g., SDAP/RRC and PDCP functions) than the functions that the connected DU has. In the example of FIG. 4, the CUs 10a, 10b, and 10c are connected to the DUs 20a, 20b, and 20c, respectively.

The single RU 30 has at least a radio wave transmission/reception function among the functions of the base station (e.g., an RF function). The RU 30 is deployed at the antenna site and is connected to the plurality of DUs 20. Thereby, the plurality of slices 1 to 3 provided via a plurality of DUs 20 are provided in the same cell formed by the RU.

In this embodiment, as described in the comparative example above, the deployment of the corresponding CU 10 and DU 20 is different depending on the slice (service). For slice 1 (mMTC slice), the CU 10a is deployed at the data center between the local accommodation station and the core network, and the DU 20a is deployed at the antenna site. This is to make the computing resources of the data center efficiently available through statistical multiplexing effects, as described above.

For slice 2 (URLLC slice), the CU 10b is deployed at the local accommodation station and the DU 20b is deployed at the antenna site. As a result, MEC can be introduced, and low latency can be realized. In this embodiment, the CU 10b is coupled to an Edge App (Edge Application Server) 70, which is an edge server that is deployed at an edge site and has an application for providing low-latency services. Note that the edge site at which Edge App70 is deployed may be a local accommodation station at which the CU 10b is deployed.

For slice 3 (eMBB slice), both CU 10c and DU 20c are deployed at the local accommodation station. This allows the DU 20c to be connected to a plurality of RUs 30 which are deployed at different antenna sites, respectively. In the present embodiment, the DU 20c is connected to a plurality of RUs 30 forming different cells, and performs a process for inter-cell coordination (e.g., CoMP (Coordinated Multi-Point Transmission/reception)) between the connected RUs. In this way, it is possible to improve the wireless communication quality by enabling inter-cell coordination.

In the present embodiment, a scheduler of each of the DUs 20a, 20b, and 20c performs scheduling for allocating radio resources to wireless terminals that accessing corresponding slices in the cell formed by the RU 30. The radio resources used by the RU 30 are distributed to the schedulers of the respective DU 20 by the RAN controller 40 in advance. The schedulers of the respective DU 20 use the radio resources distributed from the RAN controller 40 to schedule the wireless terminals accessing the corresponding slices. Each wireless terminal in the cell formed by the RU 30 can receive the provision of a service by accessing the slice to be accessed among the slices 1 to 3 using the allocated radio resources.

<Configuration CU, DU, and RU>

Figure 8:
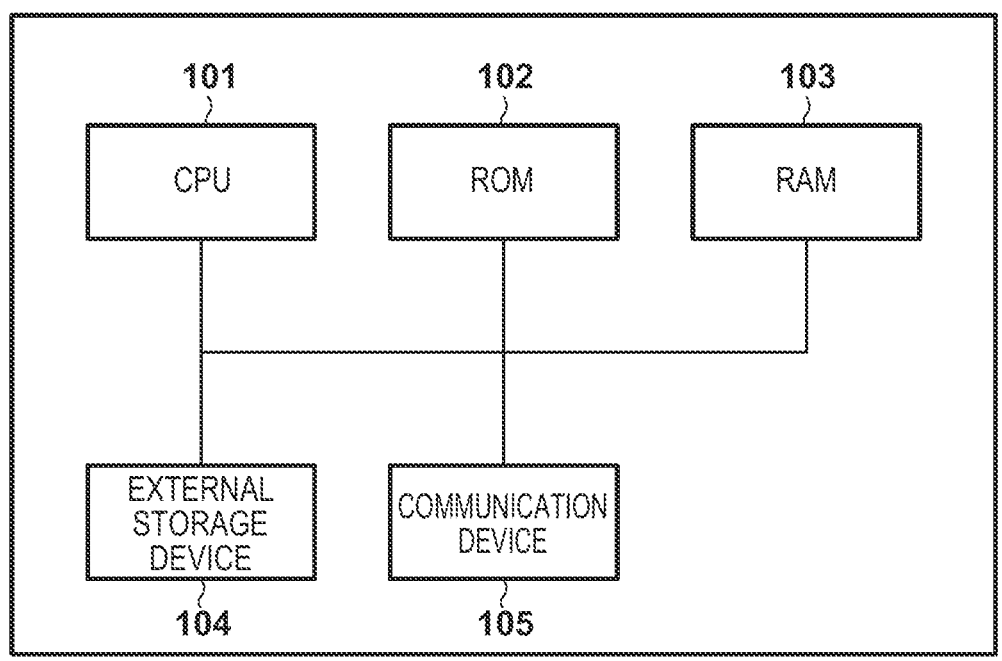
FIG. 8 is a diagram illustrating an example of a hardware configuration of a wireless communication apparatus.

The CU 10 and the DU 20 have a hardware configuration as shown in FIG. 8, for example. Specifically, the CU 10

(DU 20) includes a CPU 101, ROM 102, RAM 103, an external storage device 104 such as an HDD, and a communication device 105.

In the CU 10 (DU 20), a program for implementing the above-described functions of the CU 10 (DU 20) that is stored in either the ROM 102, the RAM 103 or the external storage device 104, for example, is executed by the CPU 101. Note that the CPU 101 may be replaced by one or more processors, such as an ASIC (an application-specific integrated circuit), an FPGA (field programmable gate array), or a DSP (digital signal processor).

The communication device 105 is a communication interface for communicating with external devices, such as a node in the core network (5GC CPF 60 and 5GC UPF 50), a RAN controller 40, and a connected DU 20 (CU 10), under the control of the CPU 101. The CU 10 (DU 20) may include a plurality of communication devices 105 having different connection destinations.

Note that the CU 10 (DU 20) may be provided with dedicated hardware for executing the above-described functions, or may execute a portion thereof in hardware and execute the rest with a computer running a program. Also, all functions may be performed with a computer and a program.

The RU 30 may also have the hardware configuration as shown in FIG. 8. In addition to the communication interface for communication with the respective DUs 20, the RU 30 also includes, as the communication device 105, a wireless communication interface for wireless communication with the wireless terminals.

As described above, the base station system of the present embodiment includes a plurality of CUs 10, a plurality of DUs 20, and a single RU 30. The plurality of DUs 20 each have at least a radio resource scheduling function among the functions of the base station, and each correspond to one or more slices. The plurality of CUs 10 are each connected between a different one DU among of the plurality of DUs 20 and a core network, and each has, among the functions of the base station, a upper layer function than functions that the DU has. The RU 30 has at least a radio wave transmission/reception function among the functions of the base station, and is deployed at the antenna site. The RU 30 is connected to a plurality of DUs 20, and a plurality of slices provided through the plurality of DUs 20 are provided in the same cell formed by the RU 30.

Thus, in the present embodiment, the plurality of DUs 20 and CUs 10 are connected to the single RU 30 (single cell). This makes it possible to provide a plurality of slices (services) within the same cell. Therefore, it becomes possible to quickly and flexibly cope with an addition or change of the service using the RAN controller 40, and it becomes possible to avoid an increase in the cost associated with the installation of the RUs due to an increase in the number of slices. In addition, it is possible to use a DU suitable for the service requirements for each slice.

Variations

Various modifications can be made to the first embodiment described above. For example, a base station system may be configured with a plurality of CUs, a single DU 20, and a single RU 30. In that case, the DU 20 is configured to have at least a radio resource scheduling function among the base station functions. The plurality of CUs 10 each correspond to one or more slices, and are connected between the DU 20 and a core network, and are configured to have, among the base station functions, a upper layer function than the functions that the DU 20 has. The RU 30 is configured to have at least a radio wave transmission/reception function among the base station functions, and is deployed at the antenna site. The RU 30 is connected with the DU 20, and a plurality of slices that are provided via the DU 20 and to which the plurality of CUs 10 correspond are provided in the same cell formed by the RU 30.

In this case, the scheduler included in the DU 20 performs scheduling for allocating radio resources to the wireless terminals accessing each of the plurality of slices in the cell formed by the RU 30. The radio resources used by the RU 30 are distributed to the plurality of slices by the RAN controller 40 in advance. The scheduler of the DU 20 performs scheduling for the wireless terminals using the radio resources distributed from the RAN controller 40 to the slice accessed by the wireless terminal in the cell. Each wireless terminal in the cell formed by the RU 30 can receive the provision of a service by accessing the slice to be accessed among the slices 1 to 3 using the allocated radio resources.

As described above, according to the above-described modification, it is also possible to provide a plurality of slices (services) in the same cell formed by the RU 30, and it is possible to obtain the same advantages as those of the above-described embodiment.

Second Embodiment

In the second embodiment, a specific example of data transfer control related to each slice in the base station system described in the first embodiment will be described. In the following, descriptions of portions common to those of the first embodiment are omitted.

FIG. 5 is a diagram showing a configuration example of a base station system according to the present embodiment. In the present embodiment, an antenna site is provided with a wireless communication apparatus 100 including an RU 30 and one or more DUs of a plurality of DU 20. The wireless communication apparatus 100 can be realized by, for example, the configuration shown in FIG. 8. The wireless communication apparatus 100 comprises a single communication port that is communicatively coupled with a CU 10 and a DU 20 external to the apparatus. In a line (front haul link) between the communication port and the external CU 10 and DU 20, intermediate data of the CU 10 and the DU 20 is encapsulated in an Ethernet® frame and is transmitted.

As shown in FIG. 5, the wireless communication apparatus 100 includes transfer control units 110 (110a, 110b) for controlling the transfer of data between a CU and a DU and between a DU and an RU. The transfer control unit 110 performs data transfer control such that data related to a corresponding slice (slice 3) is transferred between the RU 30 and a DU 20 (DU 20c) outside the wireless communication apparatus 100. The transfer control unit 110 further performs transfer control such that data related to a corresponding slice (slice 1, slice 2) is transferred between one or more DUs 20 (20a, 20b) in the wireless communication apparatus 100 and a CU 10 (10a, 10b) outside the wireless communication apparatus 100.

In the present embodiment, the data related to each slice is appropriately transferred between a CU and a DU and between a DU and an RU by the transfer control as described above. This allows each CU 10 and each DU 20 to process the corresponding slice.

Next, a specific example of transfer control by the transfer control unit 110 will be described. In the present embodiment, the transfer control units 110 (110a, 110b) broadcast the intermediate data to upper layer functions or lower layer functions at the base station function dividing point for division between the DU 20 and the RU 30, and at the base station function dividing point for division between the CU 10 and the DU 20. The CU 10 or the DU 20 extracts, from the received intermediate data, only data to be processed by its own function and processes the extracted data.

For example, the transfer control unit 110b receives downlink data transmitted from the CUs 10a and 10b and the DU 20c outside the wireless communication apparatus 100, and broadcasts received downlink data to the RU 30 and the DUs 20a and 20b in the apparatus. On the other hand, the RU 30 and the DUs 20a and 20b each processes, among the received downlink data, downlink data having a format corresponding to the function of that unit.

The transfer control unit 110a broadcasts uplink data transmitted from the RU 30 to the DUs 20a and 20b in the apparatus, and to the CUs 10a and 10b and the DU 20c outside the wireless communication apparatus 100. In addition, the transfer control unit 110b broadcasts uplink data transmitted from the DUs 20a and 20b in the apparatus to the CUs 10a and 10b and the DU 20c outside the wireless communication apparatus 100. On the other hand, the DUs 20a and 20b in the apparatus and the external CUs 10a and 10b and DU 20 each processes, among the received uplink data, uplink data having a format corresponding to the function of that unit.

As described above, in the present embodiment, the transfer control unit 110 performs transfer control using, for example, broadcast transmission so that uplink or downlink data associated with each slice is reliably transferred to the CU 10 or the DU 20 of the corresponding slice. According to this embodiment, as in the first embodiment, various services can be accommodated in a single RU 30, and a plurality of slices can be accommodated in a single cell. In addition, it is possible to quickly and flexibly cope with the addition or change of a service using the RAN controller 40.

Third Embodiment

In the third embodiment, as a modification of the second embodiment, an example in which control of data transfer between the CU and the DU and data transfer between the DU and the RU is realized by using slice identifiers indicating the respective slices will be described. Note that in the following, descriptions of portions common to those of the first and second embodiments are omitted.

In the second embodiment, the transfer control units 110 (110a, 110b) broadcast the intermediate data to the upper layer functions or the lower layer functions at the base station function dividing point for division between the DU 20 and the RU 30, and at the base station function dividing point for division between the CU 10 and the DU 20. This is because it is not possible to identify which slice the data to be transferred corresponds to. That is, because it is impossible to determine a unit to which data is transferred, broadcast transmission is performed to any potential unit. Therefore, unnecessary data transfer may occur between units (between functions).

Accordingly, in the present embodiment, by determining the transfer destination of the data using the slice identifier and performing the transfer control, unnecessary data transfer between the units (between functions) is prevented. By this, the efficient data processing is realized in each unit (function).

Figure 6:
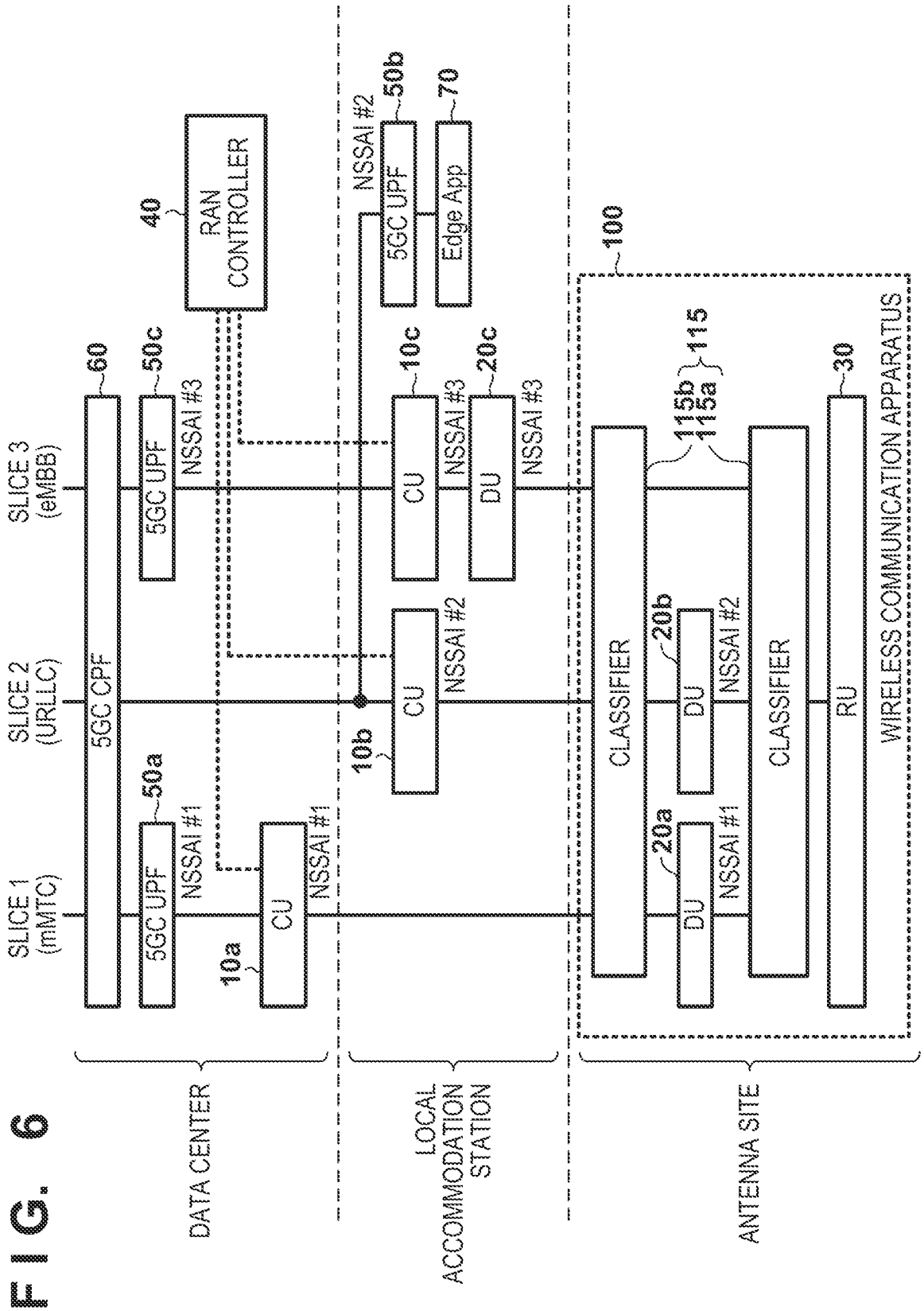
FIG. 6 is a diagram showing a configuration example of a base station system (Third Embodiment).

FIG. 6 is a diagram showing a configuration example of a base station system according to the present embodiment. In the present embodiment, the transfer control unit 110 (FIG. 5) in the wireless communication apparatus 100 of the second embodiment is configured as a classifier 115 (115a, 115b). The classifier 115 determines the transfer destination of the data using the slice identifier and transfers the data to the determined transfer destination. That is, the classifier 115 classifies, for each slice, the data to be transferred and performs the transfer control. The classifier 115 uses, as a slice identifier indicating each slice, an NSSAI (Network Slice Selection Assistance Information) defined as a slice identifier used in the core network.

Figure 7:
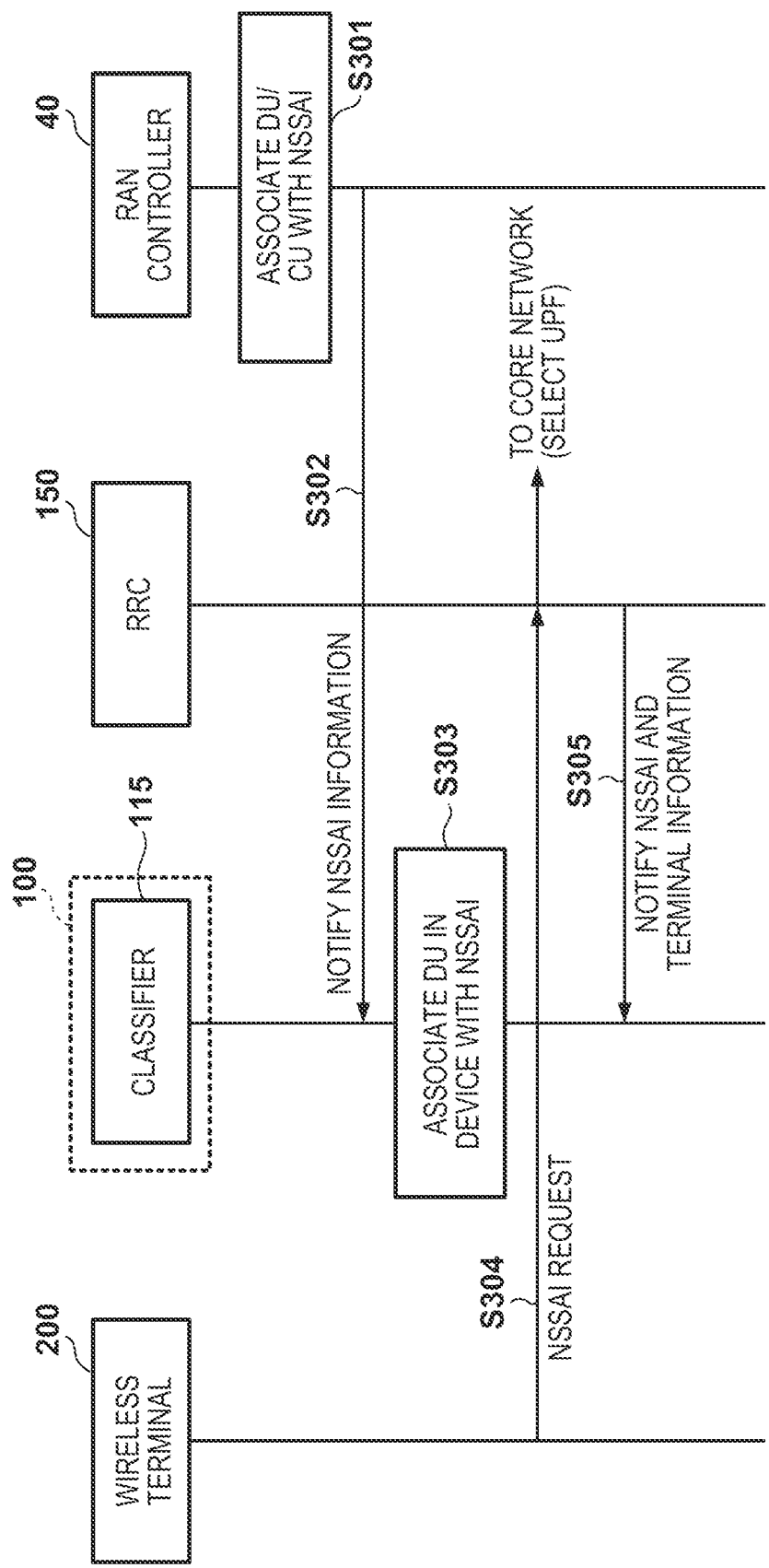
FIG. 7 is a sequence diagram showing an exemplary process of obtaining an NSSAI (Third Embodiment).

FIG. 7 is a sequence diagram illustrating an exemplary process of obtaining an NSSAI by the classifier 115. First, the RAN controller 40 associates the CU 10 and the DU 20 with an NSSAI (step S301) when generating slices 1 to 3 (generating the CU 10 and making the network settings for the CU 10 and the DU 20). Further, the RAN controller 40 notifies the wireless communication apparatus 100 (classifier 115) of correspondence information of the CU 10 and the DU 20 with the NSSAI, as NSSAI information (step S302).

Based on the notification from the RAN controller 40, the classifier 115 associates each of the DUs 20a and 20b in the wireless communication apparatus 100 with the NSSAI and stores the association (step S303). In this way, the classifier 115 obtains, from the RAN controller 40, information related to an NSSAI indicating a slice corresponding to each CU 10 and each DU 20, and based on the obtained information, associates each of the DU 20a and 20b in the apparatus with the NSSAI and stores the association.

The wireless terminal 200 in the cell of the RU 30 then sends an NSSAI request, including an NSSAI, in an RRC message when the wireless terminal 200 starts a particular application (step S304). Thus, the RRC function 150 of the control plane CU (CU-CP) in the RAN notifies the core network of the NSSAI, and in the core network, the UPF is selected using the notified NSSAI. The RRC function 150 notifies the classifier 115 of the NSSAI and the terminal information of the wireless terminal 200 (step S305).

In this way, the classifier 115 receives a notification including the NSSAI transmitted from the wireless terminal when the wireless terminal 200 accesses any of the slices, from a function unit (RRC function 150) of a control plane node apparatus (CU) capable of communicating with the wireless communication apparatus 100. Thus, the classifier 115 maintains the information of the wireless terminal 200 that performs a wireless connection to the RU 30 and accesses a slice, and the NSSAI of the slice to be accessed, in association with each other.

The classifier 115 performs data transfer control as follows using the information obtained as described above. For downlink, the classifier 115b receives downlink data transmitted from the CUs 10a and 10b and the DU 20c outside the wireless communication apparatus 100, and determines the NSSAI from the transmission source address of each received downlink data (the transmission source address of the Ethernet frame). Further, the classifier 115b transfers the downlink data to the unit corresponding to the determined NSSAI among the DUs 20a and 20b in the apparatus and the RU 30.

For the uplink, the classifier 115a determines the NSSAI based on the scheduling information (the UL grant) associated with the uplink data transmitted from the RU 30. In addition, the classifier 115a transfers uplink data transmitted from the RU 30, to any of the DU 20a the DU 20b in the apparatus and/or the external DU 20c corresponding to the determined NSSAI. Also, the classifier 115b transfers uplink data transmitted from the DUs 20a and 20b in the apparatus, to an external CU 10 (the CU 10a or the CU 10b) corresponding to the determined NSSAI. Note that uplink data (intermediate data) transmitted to the outside of the wireless communication apparatus 100 is encapsulated in an Ethernet frame and transmitted.

As described above, in the present embodiment, the classifier 115 for classifying, for each slice, the data to be transferred in the wireless communication apparatus 100 (that is, for determining the transfer destination of the data) is introduced. This makes it possible to reduce unnecessary data transfers that may occur between units (between functions). As a result, usage efficiency of computing resources the CU 10 and the DU 20, and usage efficiency of the transmission bandwidth of a front haul line can be improved.

Fourth Embodiment

In the scheduling of radio resources when network slicing is applied, it is necessary to realize not only isolation in which the slices do not interfere with each other but also scheduling in accordance with schedulers being deployed at different locations. Accordingly, in the fourth embodiment, an example that realizes, in the base station systems to which the network slicing according to the above-described embodiments is applied, scheduling by scheduling functions of a plurality of DUs 20 having different deployment locations will be described. Note that in the following, descriptions of portions common to those of the first and third embodiments are omitted.

Figure 9:
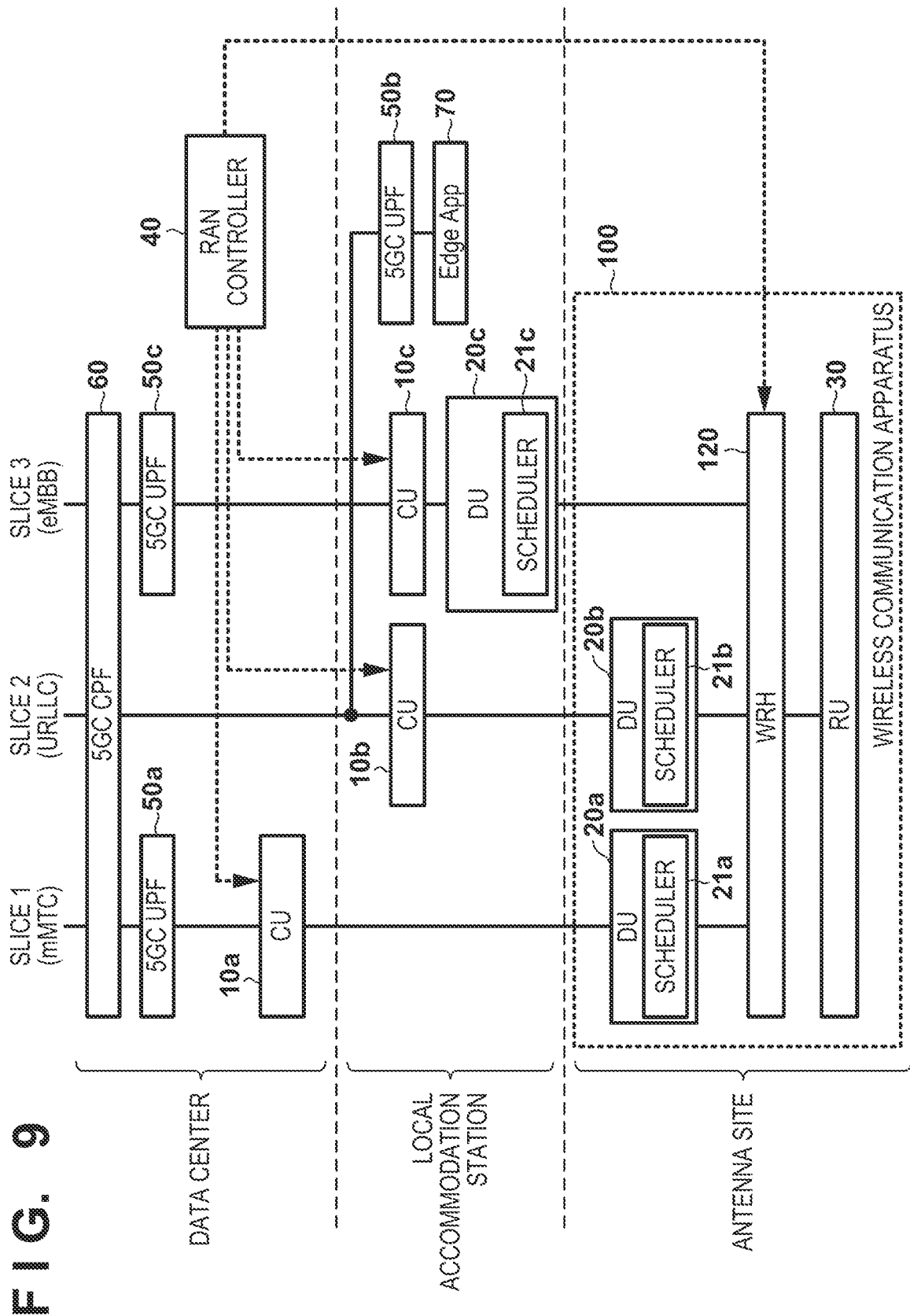
FIG. 9 is a diagram showing a configuration example of a base station system (Fourth Embodiment).

FIG. 9 is a diagram showing a configuration example of a base station system according to the present embodiment. DUs 20a, 20b, and 20c respectively includes schedulers 21a, 21b, and 21c that perform scheduling for allocating radio resources to wireless terminals. As shown in FIG. 9, the schedulers 21a and 21b corresponding to the slices 1 and 2 are deployed at the antenna site, and the scheduler 21c corresponding to the slice 3 is accommodated in the local accommodation station. Thus, the schedulers 21a and 21b and the scheduler 21c are deployed at different locations.

In addition to the DUs 20a and 20b, and the RU 30, the wireless communication apparatus 100 of the present embodiment includes a Wireless Resource Hypervisor (WRH) 120 deployed between RU 30 of the lower layer and the DU 20 of the upper layer. The WRH 120 (resource control unit) has a function of, in accordance with allocation ratios notified from the RAN controller 40, allocating resource blocks (RBs) of radio resources to be used in the corresponding slices, to the plurality of schedulers 21 (21a, 21b, 21c) corresponding to the slices 1 to 3 As will be described later, the WRH 120 also has a function of transmitting scheduling information received from each scheduler 21 to the lower layer function (the RU 30) at appropriate timings.

Figure 10:
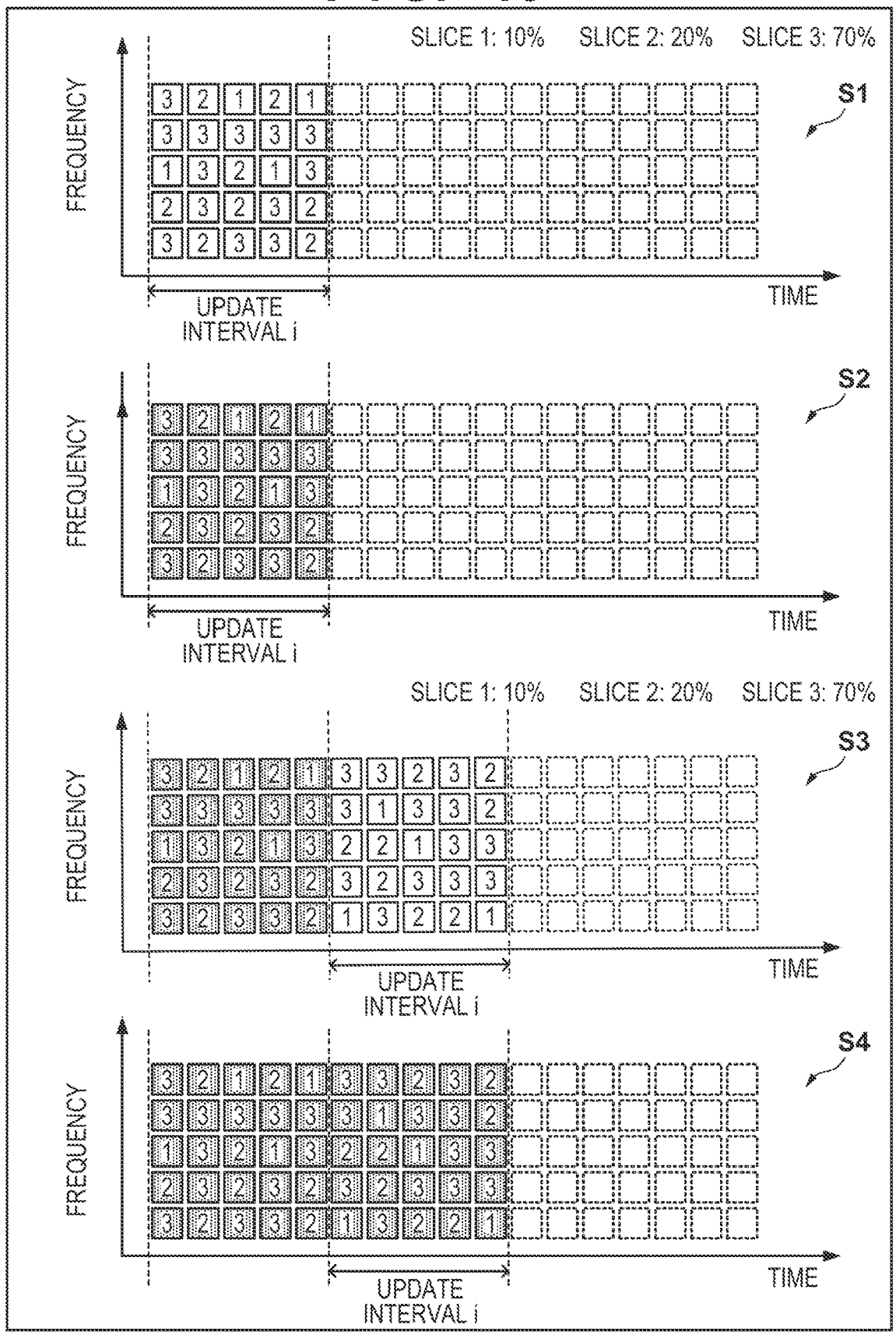
FIG. 10 is a diagram illustrating an example of the allocation of radio resources to each slice (Fourth Embodiment).

Referring now to FIG. 10, examples of allocating radio resources to each slice (each scheduler 21) by the WRH 120 will be described. The allocation ratio of radio resources for each slice is set by the RAN controller 40 for each slice and notified from the RAN controller 40 to WRH 120. In the example of FIG. 10, 10%, 20%, and 70% are set as the allocation ratios for slices 1 to 3, respectively.

For each update interval i, the WRH 120 randomly allocates RBs in a period corresponding to the update interval, to each slice in accordance with the notified allocation ratio (step S1). Note that the WRH 120 may assign RBs to slices according to some particular algorithm. The update interval i may be determined in advance according to the number of slices set for a plurality of CUs 10 and a plurality of DUs 20.

Next, each scheduler 21 performs scheduling for the wireless terminals that access the corresponding slices, using the RBs allocated from the WRH 120 (step S2). That is, each scheduler 21 allocates the RBs allocated from the WRH 120, to the wireless terminals accessing the corresponding slices.

After that, the WRH 120 randomly allocates RBs in a period corresponding to the next update interval, to each slice in accordance with the notified allocation ratio (step S3). Also, each scheduler 21 performs scheduling for the wireless terminals that access the corresponding slices, using the RBs allocated from the WRH 120 (step S4). Repeating such processing provides isolation in scheduling of radio resources within the base station system to which network slicing is applied.

In this manner, isolation in scheduling of radio resources can be realized by using WRH 120. On the other hand, due to the fact that the deployment locations of the schedulers 21 corresponding to the respective slices are different from each other, a time difference may occur in the arrival of the scheduling information indicating the scheduling from the respective schedulers 21 to RU 30. In the present embodiment, in order to cope with such a difference in arrival time of the scheduling information, after receiving the scheduling information from the respective schedulers 21, the WRH 120 transfers the scheduling information to the RU 30 at transfer timings that arrive at predetermined time intervals.

Figure 11:
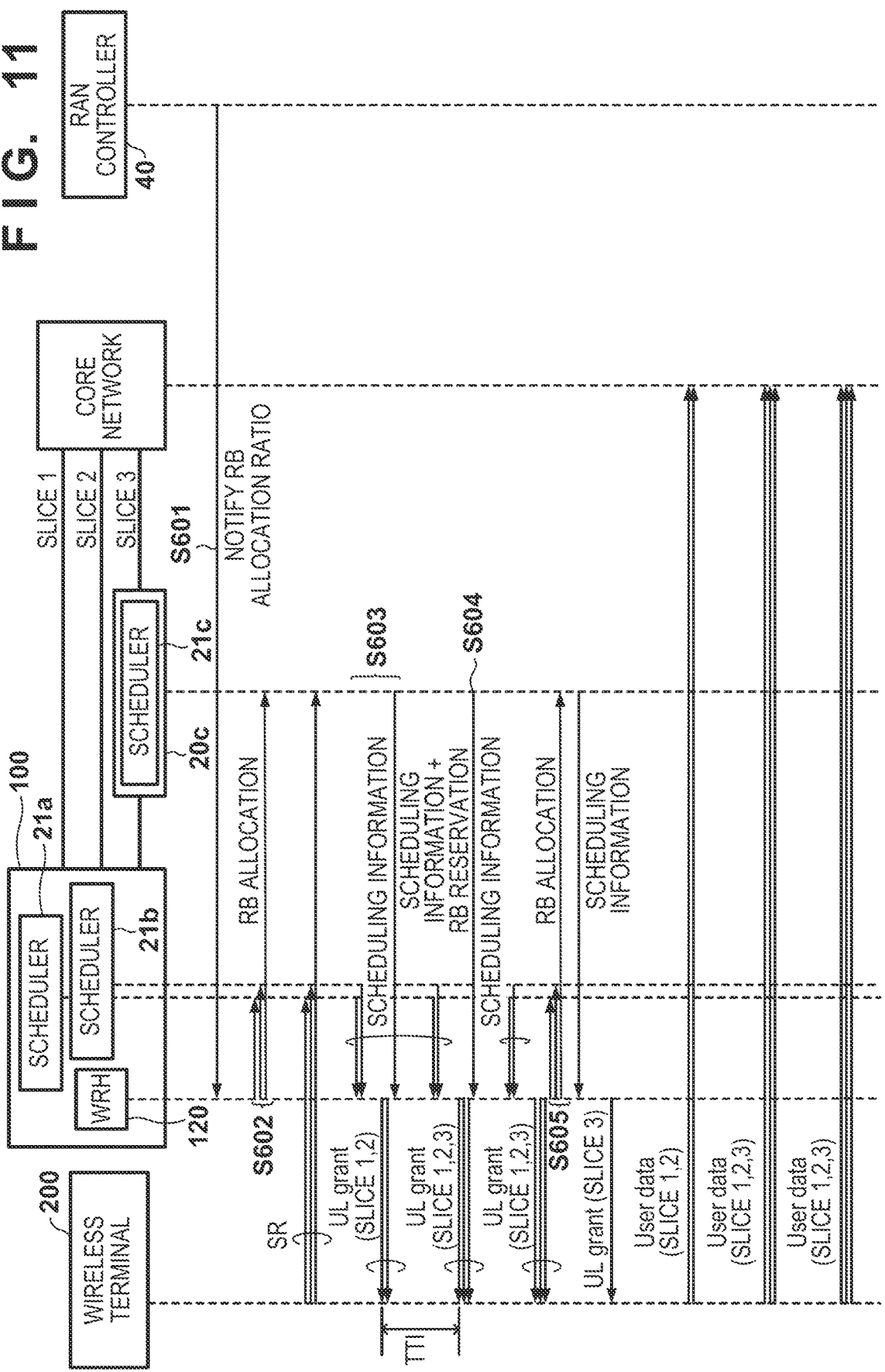
FIG. 11 is a sequence diagram of uplink communication (Fourth Embodiment).
Figure 12:
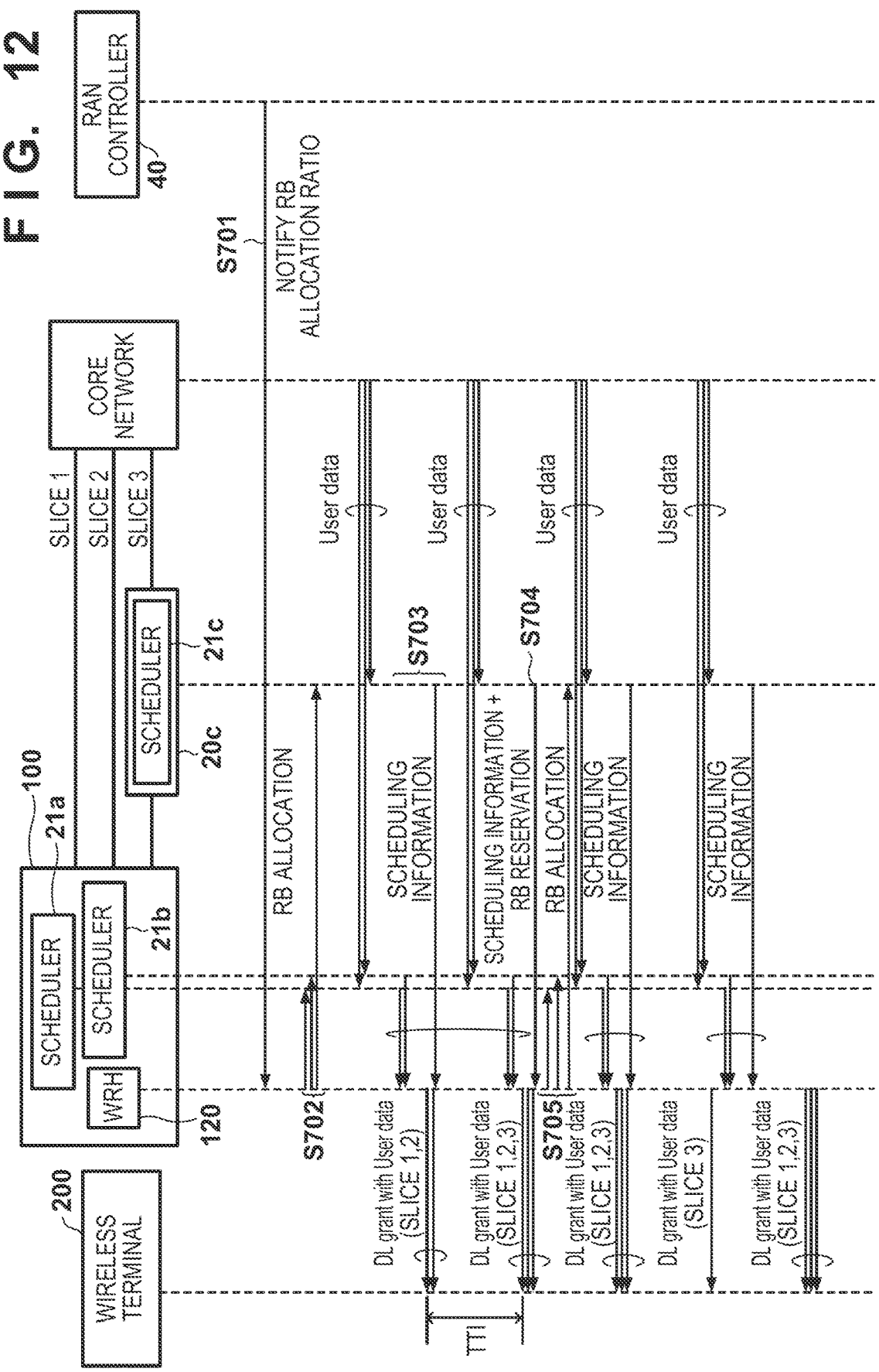
FIG. 12 is a sequence diagram of downlink communication (Fourth Embodiment).

FIGS. 11 and 12 are sequence diagrams each showing an example of a sequence of uplink communication and downlink communication in the base station system according to the present embodiment. The WRH 120 executes the same transfer control as the transfer control of the scheduling information in uplink communication and downlink communication.

First, the RAN controller 40 sets the allocation ratios of RBs for respective slices based on the slice design policy, and notifies the WRH 120 of the set allocation ratios (step S601, step S701). The WRH 120 allocates RBs in the period corresponding to the update interval i, to each scheduler 21 according to the notified allocation ratios, and notifies each scheduler 21 of the information indicating the allocation result (step S602, step S702).

Assume that an uplink or downlink scheduling request is thereafter simultaneously sent from the wireless terminal 200 in the cell formed by the RU 30 or from the core network to each scheduler 21. In this instance, each scheduler 21 performs scheduling using RBs allocated from the WRH 120 based on a predetermined scheduling algorithm (such as Round Robin, Proportional Fairness, or Max C/I). Each scheduler 21 notifies scheduling information indicating a result of the scheduling to the WRH 120 (step S603 and step S703).

At this time, a delay may occur in the arrival time of the scheduling information from the scheduler 21c deployed in the local accommodation station with respect to the arrival time of the scheduling information from the schedulers 21a and 21b in the wireless communication apparatus 100. In this example, the arrival of the scheduling information from the scheduler 21c is not in time for the transmission timing of the UL grant or the DL grant in a certain transmission time interval (TTI) after the arrival of the scheduling information from the schedulers 21a and 21b. Therefore, the WRH 120 collectively transfers the scheduling information from the scheduler 21c to the RU 30 together with the scheduling information thereafter received from the schedulers 21*a* and 21*b*, in the subsequent TTIs. That is, when the scheduling information of the slice 3 from the scheduler 21*c* is not in time for the same TTI as the transmission of the UL grant or the DL grant for the other slice, the WRH 120 performs the transmission control of the scheduling information so that the UL grant or the DL grant for the slice 3 is transmitted in the subsequent TTI. As a result, the RU 30 transmits a UL grant or DL grant of slices 1 to 3 to the wireless terminal 200 in the subsequent TTI according to scheduling information from the schedulers 21*a*, 21*b*, and 21*c*.

In this manner, after receiving the scheduling information from each of the schedulers 21, the WRH 120 transfers the scheduling information to the RU 30 at a transfer timing that arrive at each predetermined time interval (TTI). That is, after receiving the scheduling information from the respective schedulers 21, the WRH 120 buffers the scheduling information until the next transfer timing arrives at each predetermined time interval (TTI).

When inter-cell coordination such as CoMP is performed in slice 3, for example, reservation information for reserving RBs to be used in the corresponding slice 3 may be transmitted from the scheduler 21*c* to the WRH 120 together with the scheduling information (step S604, step S704). In this case, when receiving the reservation information from any of the plurality of schedulers 21, the WRH 120 performs allocation of RBs to the plurality of schedulers in accordance with the reservation information. Specifically, the WRH 120 allocates RBs indicated by the reservation information among the RBs to be allocated to the scheduler 21*c* of the transmission source of the reservation information, and allocates the remaining RBs to the plurality of schedulers 21*a*, 21*b*, and 21*c* according to the allocation ratio notified from the RAN controller 40. The WRH 120 notifies information indicating the allocation result to each of the schedulers 21 (step S605, step S705).

In this way, the WRH 120 allocates RBs to the plurality of schedulers 21 at the timing of each of the update intervals i determined according to the number of slices, and also allocates RBs to the plurality of schedulers 21 at the timing when the RBs are reserved. Note that the RB reservation described above may be performed not only for reservation of RBs used for CoMP, but also for reservation of RBs to be allocated to a wireless terminal (e.g., an IoT device) using limited RBs, for example. This makes it possible to simplify the receiver of the IoT device, thereby contributing to power saving of the IoT device.

As described above, according to the present embodiment, in a base station system to which network slicing is applied, isolation between slices in scheduling of radio resources can be realized. Further, even if the deployment location of the scheduler 21 is different for each slice, it becomes possible to allocate radio resources to the wireless terminal at an appropriate timing.

Other Embodiments

The wireless communication apparatus according to the above embodiment can be realized by a computer program for causing a computer to function as the wireless communication apparatus. The computer program can be stored on a computer readable storage medium and distributed, or can be distributed over a network.

The present invention is not limited to the above embodiments, and various changes and modifications can be made without departing from the spirit and scope of the present invention. Therefore, to make the scope of the invention public, the following claims are appended.

What is claimed is:

1. A base station system, comprising:
a plurality of first units each having at least a radio resource scheduling function among functions of a base station, and each being used to provide one or more slices;
a plurality of second units connected with respective first units among the plurality of first units, wherein each of the plurality of second units is connected between a corresponding first unit of the plurality of first units and a core network, and has, among the functions of the base station, a upper layer function than a function that the corresponding first unit has; and
one radio unit having at least a radio wave transmission/reception function among the functions of the base station, and deployed at an antenna site,
wherein the one radio unit is connected with the plurality of first units, and a plurality of slices provided via the plurality of first units are provided in the same cell formed by the one radio unit.

2. The base station system according to claim 1, further comprising a RAN (Radio Access Network) controller configured to distribute radio resources to the plurality of first units,
wherein a scheduler that each of the plurality of first units has is configured to perform scheduling for allocating radio resources to a wireless terminal that accesses a corresponding slice in the cell formed by the one radio unit, and
wherein the scheduler is configured to perform the scheduling for a wireless terminal that accesses the corresponding slice, using radio resources distributed from the RAN controller.

3. The base station system according to claim 2, wherein the RAN controller is configured to set, for the plurality of first units and the plurality of second units, a slice corresponding to a service requirement,
a particular first unit in the plurality of first units is deployed at a local accommodation station between the antenna site and the core network, and
the particular first unit is connected with a plurality of radio units that form respectively different cells, and is configured to perform processing for inter-cell coordination among the connected plurality of radio units.

4. The base station system according to claim 3, wherein a particular second unit in the plurality of second units is deployed at a local accommodation station between the antenna site and the core network,
a first unit related to the particular second unit among the plurality of first units is deployed at the antenna site, and
the particular second unit is connected with an edge server that is deployed at an edge site and that has an application for providing a low-latency service.

5. The base station system according to claim 4, wherein the base station system includes a wireless communication apparatus including the one radio unit and including one or more first units among the plurality of first units, and
the wireless communication apparatus comprises a transfer control unit configured to perform transfer control so that data related to a corresponding slice is transferred between the one radio unit and a first unit external to the wireless communication apparatus and so that data related to a corresponding slice is transferred between the one or more first units and a second unit external to the wireless communication apparatus.

6. The base station system according to claim 5, wherein the transfer control unit is configured to receive downlink data transmitted from first and second units external to the wireless communication apparatus, and broadcast the respective received downlink data to the one radio unit and the one or more first units, and the one radio unit and the one or more first units each performs processing for, among the received downlink data, downlink data having a format corresponding to a function of each unit.

7. The base station system according to claim 6, wherein the transfer control unit is configured to broadcast uplink data transmitted from the one radio unit to the one or more first units and the first and second units external to the wireless communication apparatus, and broadcast uplink data transmitted from the one or more first units to the first and second units external to the wireless communication apparatus, and the one or more first units and the first and second units external to the wireless communication apparatus is each configured to perform processing for, among the received uplink data, uplink data having a format corresponding to a function of each unit.

8. The base station system according to claim 5, wherein the transfer control unit is configured to obtain, from a RAN controller, information related to a slice identifier indicating a slice corresponding to each first unit and each second unit, and based on the obtained information, associate each of the one or more first units with the slice identifier and store the association, and the transfer control unit is configured to determine a transfer destination of data using the slice identifier and transfer the data to the determined transfer destination.

9. The base station system according to claim 8, wherein the transfer control unit is configured to receive downlink data transmitted from first and second units external to the wireless communication apparatus, determine the slice identifier from a transmission source address of each received downlink data, and transfer the downlink data to a unit corresponding to the determined slice identifier among the one radio unit and the one or more first units.

10. The base station system according to claim 8, wherein the transfer control unit maintains information of a wireless terminal that performs a wireless connection to the one radio unit and accesses a slice, and the slice identifier of an access destination slice, in association with each other, and the transfer control unit is configured to:
determine the slice identifier based on scheduling information related to uplink data transmitted from the one radio unit;
transfer, to any of the one or more first units and a first unit external to the wireless communication apparatus, that corresponds to the determined slice identifier, the uplink data transmitted from the one radio unit, and
transfer, to a second unit external to the wireless communication apparatus, that corresponds to the determined slice identifier, the uplink data transmitted from the one or more first units.

11. The base station system according to claim 10, wherein
the transfer control unit is configured to receive, from a function unit that a control plane node apparatus capable of communicating with the wireless communication apparatus has, a notification including the slice identifier transmitted from the wireless terminal when the wireless terminal accesses any of the slices.

12. The base station system according to claim 5, wherein
the wireless communication apparatus further comprises a single communication port connected communicably with a first unit and a second unit external to the wireless communication apparatus, and the transfer control unit is configured to perform, via the communication port, transfer of data with respect to each of the first unit and the second unit external to the wireless communication apparatus.

13. The base station system according to claim 1,
further comprising a resource control unit, that is deployed at the antenna site, configured to, in accordance with an allocation ratio notified from a RAN controller, allocate resource blocks of radio resources to be used in a corresponding slice, to a plurality of schedulers that are included in respectively different first units and that perform scheduling for allocating radio resources to a wireless terminal, wherein the plurality of first units are deployed at the antenna site or are deployed between the antenna site and the core network, and the resource control unit is configured to, after having received from each scheduler scheduling information that indicates the scheduling, transfer to the one radio unit the scheduling information at a transfer timing that arrives at each predetermined time interval.

14. The base station system according to claim 13, wherein
each of the plurality of schedulers is configured to, in response to an uplink or downlink scheduling request, perform the scheduling using resource blocks allocated from the resource control unit, and transmit the scheduling information to the resource control unit.

15. The base station system according to claim 13, wherein
the resource control unit is configured to, at each update interval, perform allocation of resource blocks to the plurality of schedulers within a period corresponding to the update interval.

16. A radio unit constituting a part of a base station system and deployed at an antenna site, the base station system including: a plurality of first units each having at least a radio resource scheduling function among functions of a base station, and each being used to provide one or more slices; and a plurality of second units connected with respective first units among the plurality of first units, wherein each of the plurality of second units is connected between a corresponding first unit of the plurality of first units and a core network, and has, among the functions of the base station, a upper layer function than a function that the corresponding first unit has, wherein the radio unit has at least a radio wave transmission/reception function among the functions of the base station, and the radio unit is connected with the plurality of first units, and the plurality of slices provided via the plurality of first units are provided in the same cell formed by the radio unit.

17. A wireless communication apparatus deployed at an antenna site, comprising:
   the radio unit according to claim 16, and
   one or more first units among the plurality of first units.

* * * * *